US012591413B2

(12) United States Patent
Holdsworth et al.

(10) Patent No.: US 12,591,413 B2
(45) Date of Patent: Mar. 31, 2026

(54) COMPUTER PROGRAM SPECIFICATION BUILDER

(71) Applicant: ServiceNow, Inc., Santa Clara, CA (US)

(72) Inventors: Daniel Michael Holdsworth, Canberra (AU); Jose Ronnie Cruz Galvez, Canberra (AU); Stacy Ann Alsides, Minneapolis, MN (US)

(73) Assignee: ServiceNow, Inc., Santa Clara, CA (US)

( * ) Notice: Subject to any disclaimer, the term of this patent is extended or adjusted under 35 U.S.C. 154(b) by 249 days.

(21) Appl. No.: 18/512,805

(22) Filed: Nov. 17, 2023

(65) Prior Publication Data

US 2025/0165222 A1      May 22, 2025

(51) Int. Cl.
*G06F 8/10* (2018.01)

(52) U.S. Cl.
CPC ...................................... *G06F 8/10* (2013.01)

(58) Field of Classification Search
CPC ................................................ G06F 8/10
USPC ............................... 717/104–121; 706/25–45
See application file for complete search history.

(56) References Cited

U.S. PATENT DOCUMENTS

| | | | |
|---|---|---|---|
| 7,089,488 B2 | 8/2006 | Hirata | |
| 7,448,020 B2 * | 11/2008 | Kohno | G06F 8/70 717/104 |
| 7,480,893 B2 * | 1/2009 | Berenbach | G06F 8/10 717/121 |
| 8,365,164 B1 * | 1/2013 | Morgenstern | G06F 9/44552 717/175 |
| 8,370,798 B2 * | 2/2013 | Broadfoot | G06F 8/10 717/126 |
| 8,566,731 B2 * | 10/2013 | Subramanian | G06Q 10/06 715/764 |
| 9,535,663 B2 * | 1/2017 | Yaseen | G06F 8/10 |
| 9,569,198 B2 * | 2/2017 | Spivak | H04L 47/70 |
| 9,747,079 B2 * | 8/2017 | Siu | G06F 8/20 |
| 10,346,140 B2 * | 7/2019 | Johnson | G06F 8/35 |
| 11,681,504 B1 * | 6/2023 | D'Silva | G06F 16/254 717/106 |

(Continued)

FOREIGN PATENT DOCUMENTS

| | | |
|---|---|---|
| KR | 20050002468 | 1/2005 |

OTHER PUBLICATIONS

Lubos et al, "InteractiveReq: Enhancing Software Requirement Specification with Critiquing-based Recommender Systems", ACM, pp. 1-6 (Year: 2025).*

(Continued)

*Primary Examiner* — Anil Khatri
(74) *Attorney, Agent, or Firm* — MCDONNELL BOEHNEN HULBERT & BERGHOFF LLP

(57) ABSTRACT

A process for providing a computer program specification builder includes receiving a specification of requirements to be implemented for a computer program. Based on the specification of requirements, the process automatically generates a plurality of stories, wherein each story included in the plurality of stories specifies a desired goal associated with a desired feature for the computer program. The process provides a computer user interface to manage and track implementation progress of the plurality of stories associated with the specification of requirements.

16 Claims, 13 Drawing Sheets

(56) References Cited

U.S. PATENT DOCUMENTS

| | | | | |
|---|---|---|---|---|
| 11,811,681 | B1 * | 11/2023 | Kadam | .................... G06N 3/09 |
| 12,216,692 | B1 * | 2/2025 | Rogynskyy | .......... G06N 3/0475 |
| 2009/0307004 | A1 | 12/2009 | Quinn, Jr. | |
| 2020/0159525 | A1 * | 5/2020 | Bhalla | .................. G06F 21/577 |

OTHER PUBLICATIONS

Silva, "Requirements, Domain and Specifications: A Viewpoint-based Approach to Requirements Engineering", ACM, pp. 1-11 (Year: 2002).*
Hou et al, "ML Defense: Against Prediction API Threats in Cloud-Based Machine Learning Service", ACM, p. 1-10 (Year: 2019).*
Sheikholeslami et al, "Utilizing Large Language Models for Ablation Studies in Machine Learning and Deep Learning", ACM, pp. 1-8 (Year: 2025).*
Freiknecht et al, "Procedural Generation of Interactive Stories using Language Models", ACM, pp. 1-8 (Year: 2020).*

\* cited by examiner

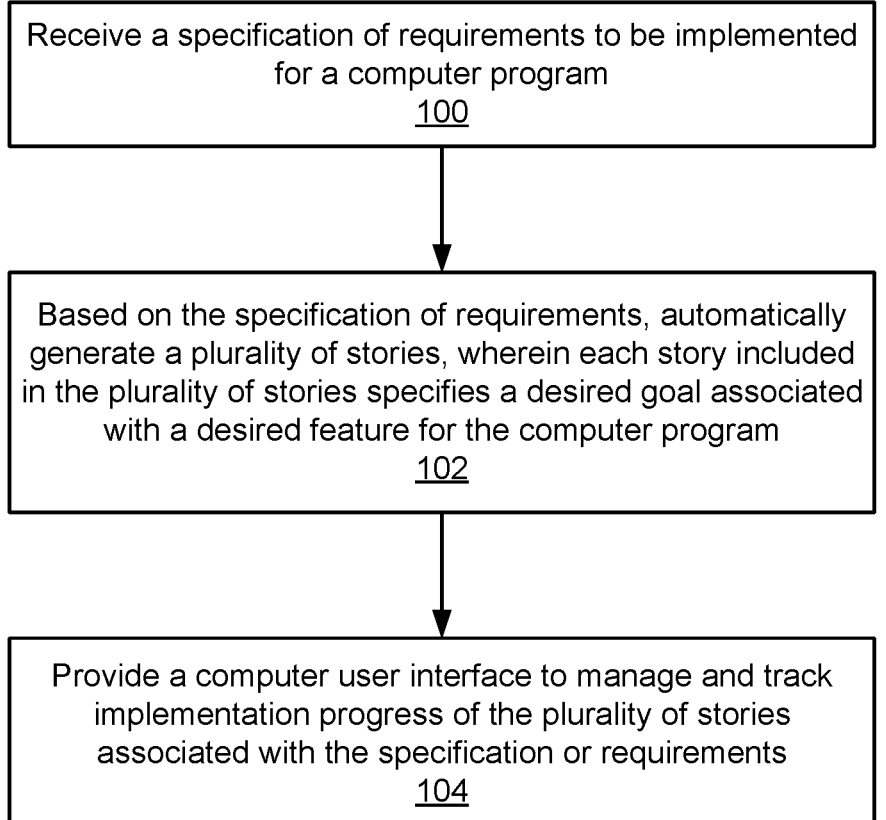

Receive a specification of requirements to be implemented
for a computer program
100

Based on the specification of requirements, automatically
generate a plurality of stories, wherein each story included
in the plurality of stories specifies a desired goal associated
with a desired feature for the computer program
102

Provide a computer user interface to manage and track
implementation progress of the plurality of stories
associated with the specification or requirements
104

FIG. 1

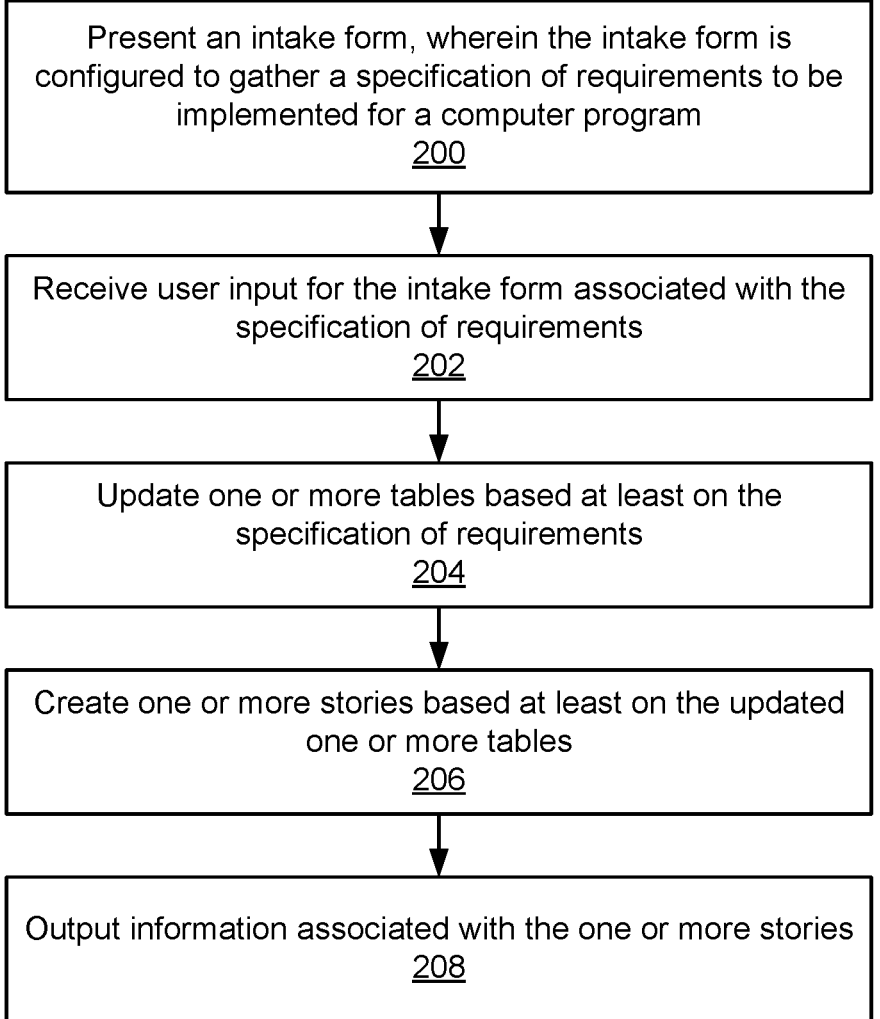

Present an intake form, wherein the intake form is configured to gather a specification of requirements to be implemented for a computer program
200

Receive user input for the intake form associated with the specification of requirements
202

Update one or more tables based at least on the specification of requirements
204

Create one or more stories based at least on the updated one or more tables
206

Output information associated with the one or more stories
208

FIG. 2

Obtain a story, wherein the story includes a desired goal
associated with a desired feature for a computer program
300

Receive approval of the story
302

Configure the computer program based at least on one or
more parameters of the story
304

Test the computer program
306

Deploy the computer program
308

Core Requirement

Create a new Core Requirement

What is the general email address for the department?

| ask@example.com | ✉ |

What is the general phone number for the HR department?

| 1-800-555-5555 |

What would you like the default priority to be for VIP requestors?

| 2 – High ▼ |

Duplicate warning wait period (in days)

| 3 |

What COEs are in scope?

| |

Fields (System User & HR Profile)

Select all User fields to exclude from synchronizing with related Profile record

| X Home phone | X Mobile phone |

Select the Profile fields editable by the users

| X Home address | X Home city | X DOB |
| X Home country | X Home phone |
| X Personal mobile phone | X Work phone |
| X Home state / province |

Select the Profile fields you want to exclude from synchronizing with the user fields

| X Home phone |
| X Personal mobile phone |

Select the Profile fields shown in "Generate Profiles" page to collectively set those values during profile creation

| X Employment type |
| X Location type |

Additional settings

Enable Case auto-categorization

| No ▼ |

Impersonation check

| No ▼ |

Inbound email?

| No ▼ |

PDF conversion?

| Yes ▼ |

Rollup work notes?

| Yes ▼ |

FIG. 7

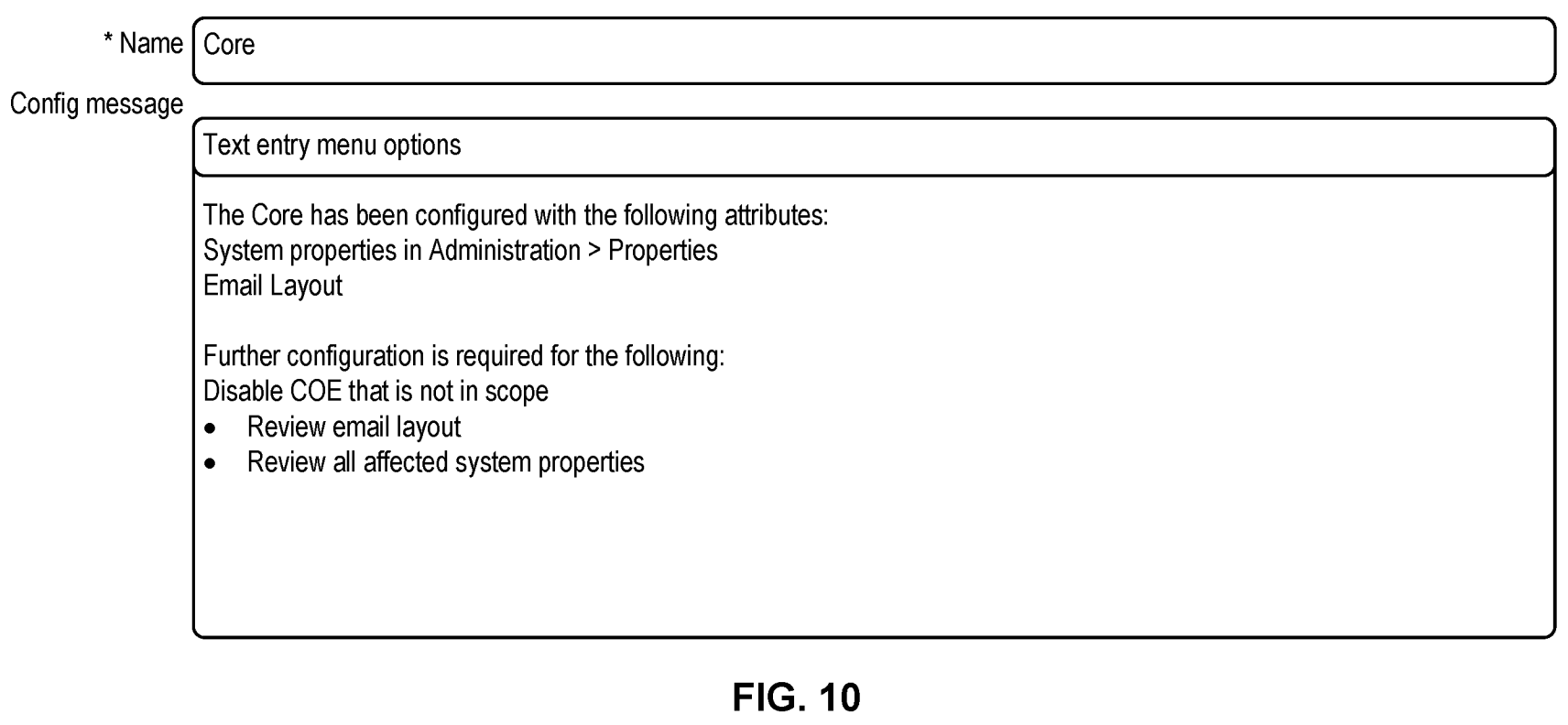

* Name | Core

Config message | Text entry menu options

The Core has been configured with the following attributes:
System properties in Administration > Properties
Email Layout Further configuration is required for the following:
Disable COE that is not in scope
● Review email layout
● Review all affected system properties

FIG. 10

Table Requirement

Define requirements for table form views, list layouts, and table security

Use this form to create a table configuration requirement, including:
- List Layouts – the default list view when the table list is loaded
- Reference/pop-up layouts – the fields visible when used as a reference by another table
  - Note: pop-up views are not available on all tables
- Form Layouts – the default form view, including the ability to:
  - Add existing fields – add existing fields to the list or form view
  - Add new fields – provide details for new fields to be added to the form
  - Remove fields – select which fields should be removed
- Table Security Access Control Lists (ACLs) – use the table security policies section to define which personas should be able to view or edit different fields

Additional settings

Which table is the requirement for?  ⓘ

| --None-- ▼ |
|---|

Current Layouts
- Form layout
- List layouts
- Reference/Pop-up layout (If applicable for a selected table. If no pop-up vie exists, default view is displayed.)

What are the fields that you want removed from the form? ⓘ

| |
|---|

What are the fields that you want added in the form? ⓘ

| |
|---|

What are the fields to be displayed in list view? ⓘ

| |
|---|

What are the fields that will be displayed in the reference or pop-up view? ⓘ

| |
|---|

Is there any other information you want to add?

| E.g., the position of fields added to the form |
|---|

FIG. 12

COMPUTER PROGRAM SPECIFICATION BUILDER

BACKGROUND OF THE INVENTION

One of the stages of developing computer programs involves creating a specification of requirements that defines how the computer program is desired to function. However, the process of creating a specification can be technically challenging. In one aspect, the collaborative process may be prone to errors due to requirements being defined by and/or reviewed by multiple users. In another aspect, a user responsible for a portion of the computer program may not understand how that portion of the computer program relates to other portions of the computer program or a user with beginning technical expertise may find it difficult to understand and define traditional computer program specifications. In yet another aspect, if many computer programs are being developed, similar requirements may be repeated for the computer programs, which can be a tedious manual process.

BRIEF DESCRIPTION OF THE DRAWINGS

Various embodiments of the invention are disclosed in the following detailed description and the accompanying drawings.

FIG. 1 is a flow diagram illustrating an embodiment of a process for providing a computer program specification builder.

FIG. 2 is a flow diagram illustrating an embodiment of a process for automatically generating a story.

FIG. 7 shows an example of a graphical user interface for a record producer.

FIG. 10 shows an example of a graphical user interface for a computer program specification builder.

FIG. 12 shows an example of a graphical user interface a record producer including links to resources.

DETAILED DESCRIPTION

Figure 3:
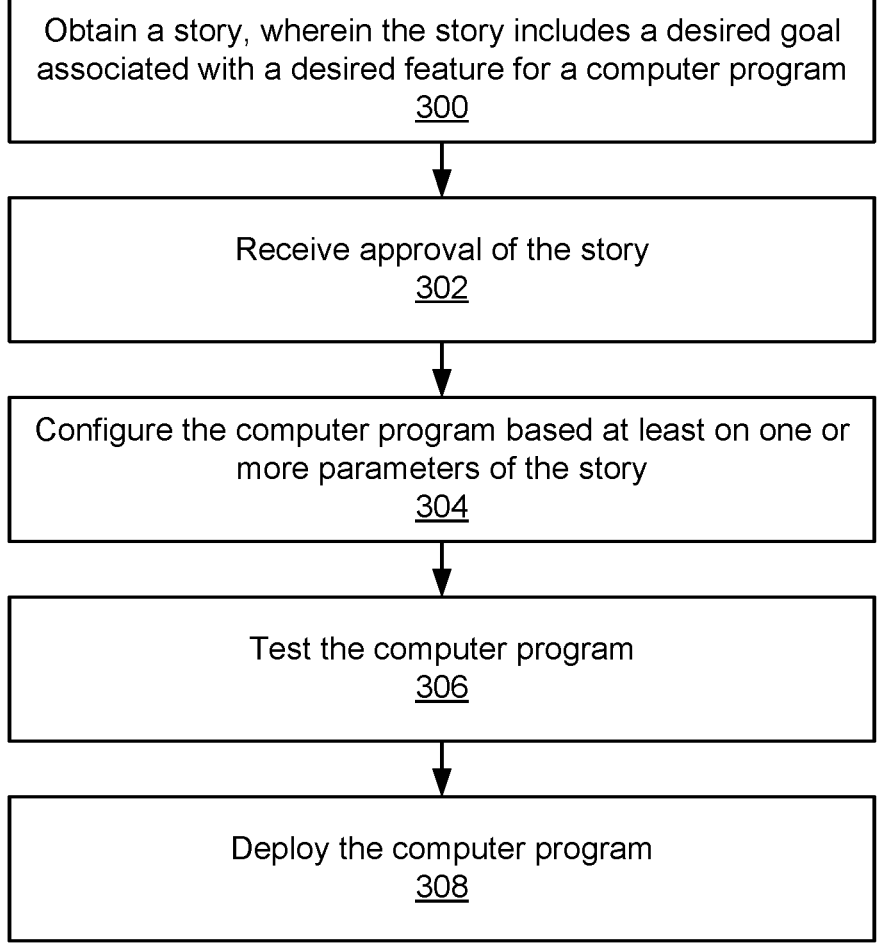
FIG. 3 is a flow diagram illustrating an embodiment of a process for developing a computer program.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for building a computer program specification are disclosed. The disclosed techniques provide a seamless end-to-end requirement gathering experience. In various embodiments, a specification of requirements to be implemented for a computer program is obtained/received. For example, requirements may be received via an intake form or record producer. At least one story is automatically generated by parsing the requirements and determining how to use the requirements to populate a story template. Each story specifies a desired goal associated with a desired feature for the computer program. A computer user interface is provided to manage and track implementation progress of the stories associated with the specification of requirements. A level of completion of a requirement, identification of an incomplete requirement, adjustments of a requirement, among other things may be communicated via the computer user interface.

The disclosed computer program specification builder improves consistency and efficiency in a requirement gathering process including by: standardizing intake of requirements, combining requirements across products where a common configuration is appropriate, enabling choices based on user data to reduce errors (e.g., incorrect input), and automatically converting requirements to stories. An associated benefit is that the stories may be used for automated configuration, and manual configuration is minimized. As further described herein, this encourages adoption of tools to create computer programs, improves user experience, and improves the technical field of computer program specification generation including on/by low-code or no-code platforms.

Conventionally, a computer program is created based on documentation that specifies the requirements of the computer program or how the program is intended to function. The documentation is typically lengthy and written by someone with technical expertise or in a style that is only easily understood by someone with domain knowledge. By contrast, a story may specify a desired goal associated with a desired feature for the computer program in more colloquial or otherwise easily understood language. A story includes one or more requirements that can be easily configured and tested because the requirements can be granular or modular. As further described herein, the disclosed techniques automatically generate a story.

FIG. 1 is a flow diagram illustrating an embodiment of a process for providing a computer program specification builder. This process may be performed as part of another process such as the one further described with respect to FIG. 2 and FIG. 3. This process may be implemented on/by computer program specification builder 420 of FIG. 4 or by processor 1302 of FIG. 13.

In the example shown, the process begins by receiving a specification of requirements to be implemented for a computer program (100). The specification of requirements may be obtained in a variety of ways. For example, a user may input information in an intake form or otherwise provide information to a record producer. As further described herein, FIG. 2 describes a process for presenting an intake form and gathering a specification of requirements via the form, and FIG. 7 shows an example of an intake form.

The obtained information may be stored and retrieved when a process for requirement building is initiated (e.g., the process of FIG. 1). In various embodiments, tables are created to store information for each computer program/product. When a requirement record producer is submitted, a record is created in a requirement table. In various embodiments, a record includes selectable fields and values for each product, application, or feature.

In various embodiments, at least a portion of the specification of requirements is constrained based at least on client specific information stored in a database. In other words, options/choices for the requirements to be included in the specification may be determined and presented. Fields on requirement tables reference data in a service instance on which the service instance is installed so that selections made on record producers are accurate and relevant. Because data is consistent with a particular client, this reduces bugs and other technical errors.

The options may be determined based on a process question that was presented to a user. For example, a process (e.g., business) question is translated into technical requirements. An example of a process question is: do you want to enable issue triaging? This single process question may be translated into three corresponding technical questions such as:

Do you want to activate logging?

Do you want to activate alert generation?

Do you want to forward the information to a manager for review?

The options may be determined using machine learning techniques. For example, a machine learning model trained on client-specific data determines and outputs one or more options. The option that is determined to be the best for the user/client may be presented as the default option. The presented options may be those relevant to a particular user's instance. As further described herein, this improves the functioning of a computer used to perform the disclosed techniques by using less computer memory as well as the technical field of computer program specification generation by reducing manual effort and technical errors.

Based on the specification of requirements, the process automatically generates a plurality of stories, wherein each story included in the plurality of stories specifies a desired goal associated with a desired feature for the computer program (102).

A story may be used to define the requirements for a computer program that is being configured. A benefit of using a story instead of conventional requirements documentation is that a story organizes requirements in a more logical way so that it is easier to understand the sub-parts/components of requirements. This makes it easier for process owners to understand whether a requirement is being met and to sign off on the requirement. A story is a brief statement of one or more product (technical) requirements or a use case. The story may be created by various users such as a product owner (e.g., a customer), a provider of the platform, or a combination thereof. Among other things, a purpose of a story is to provide a high-level definition of a requirement, capturing the who, what, and why of a computer program in a simple, concise way. A story identifies one or more of the following: a role of the user persona in the system, a need expressed by the user persona, and a benefit to stakeholders, such as developers, users, and others, of meeting the stated requirement. For example, a story associated with creating a front end of a customer portal may include instructions asking a user to provide branding, logo, and any other materials helpful for branding the customer portal.

The disclosed techniques automate the story creation process. The collaboration process takes place on a platform with digitized forms. Fields in a story may be auto-populated, so users do not need to copy and paste (copious) data. Although the disclosed computer program specification builder may be used in a variety of settings, it may be particularly helpful for a user's first few deployments when they are less familiar with the development process.

A story can be generated based at least on a story template, where the story template combines requirement record inputs with defined story templates. In various embodiments, story templates are created after the requirement records as they pull fields from requirements to generate a short description, description, and acceptance criteria fields. For example, the story template may specify that a story includes a short description, description, and acceptance criteria fields. The values of the field may be determined by determining at least a portion of the specification of requirements that corresponds to a respective field. By using templates, stories are generated in a consistent format across products and implementations.

Figure 5:
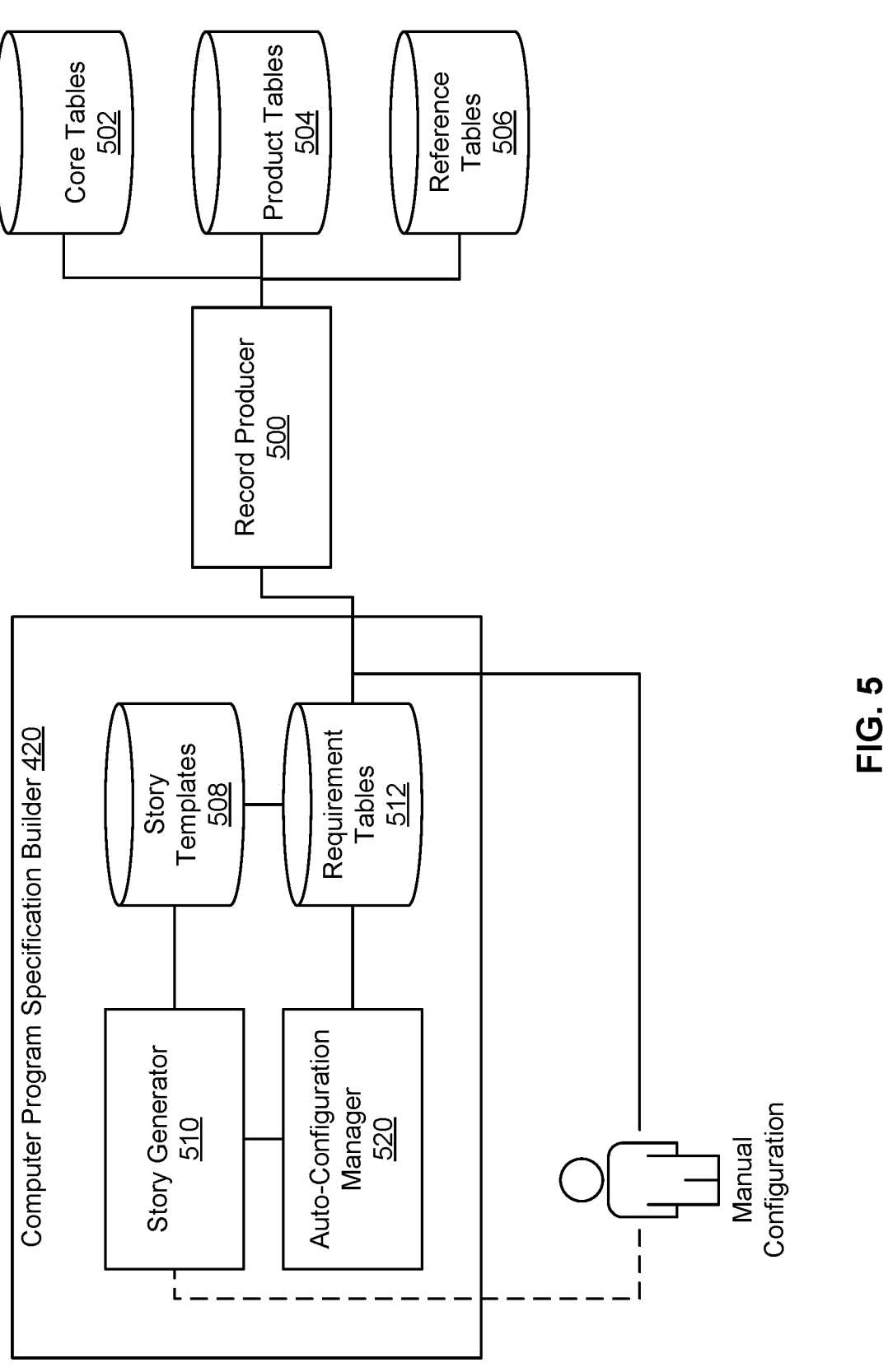
FIG. 5 is a block diagram illustrating an embodiment of a computer program specification builder.

As further described herein with respect to FIG. 5, auto-configuration can help save time and assist users by eliminating a need to analyze and move information, among other things. Conventionally, when a story is created, information provided by a user is captured in a single field. By contrast, according to the disclosed techniques, information captured in the intake form may be categorized and stored in separate fields (e.g., within tables). Because at the intake, information is categorized and stored in separate fields, upon auto-configuration, the information is automatically populated in appropriate locations. This may improve the user experience because of reduced latency to generate the story. This is because at the time a story is generated, the information is quickly and easily found, having been categorized/processed when the intake form was completed. Therefore, the technical field of computer program specification generation is improved by reducing the processing cycles needed to generate a story.

For example, a particular requirement is applicable for several stories. Auto-configuration enables a user to specify that the particular requirement applies to several stories because the stories depend on each other. After auto-configuration is completed, the system may output a configured result indicating what has been auto-configured, items for review, etc. The output may be included in documentation such as customer handover documentation. Conventionally, this type of documentation is manually written, using valuable user time and effort. By contrast, the disclosed techniques automatically generate content that may be incorporated into documentation or the like.

In various embodiments, after validating the specification of requirements, one or more stories are generated. Validation may include presenting information collected at 100 to a process owner, who reviews and approves the information. If the information is insufficient, additional information may be gathered. An example of a review process in which information may be checked and gathered is further described with respect to FIG. 6.

The process provides a computer user interface to manage and track implementation progress of the plurality of stories associated with the specification of requirements (104). For example, stories can be used as part of a computer program development/management process as follows. In one style of product management, sometimes referred to as agile product management, an epic refers to a set of stories (which are tasks). An epic can be segmented into the stories and can be used to create a hierarchy in the development process. A scrum refers to a two-week sprint (development cycle) where developers work on specific stories, which are grouped by epics and themes. The disclosed techniques create and manage stories. For example, stories may be grouped by requirements. This allows developers/users to see requirements that are related to each other. The requirements may be converted from less technical language (e.g., natural language) to the technical language that's needed for the configuration in the story. Referring again to the example of agile product management, after a story is created, the story can be associated with an epic, which is in turn associated with a product. The product, epic, and story structure supports product development within an environment including, but not limited to, a low-code or no-code environment provided by ServiceNow. A computer user interface provided at 104 allows the progress of the plurality of stories and associated requirements to be managed and tracked, such as whether development milestones are being met. Requirements may also be modified as appropriate.

Conventional scrum management tools are available. However, they typically require stories to be created by a user, which may involve exchanging emails with spreadsheets/word documents/slides of stories, and manually loading all of the information into the platform. The disclosed techniques may be used to automatically generate stories. In one aspect, this eliminates the need to exchange emails and manually input data. In another aspect, this reduces errors because information is automatically collected and incorporated into stories. In the conventional process, many errors may result from exchanging and modifying the emails with the spreadsheets, word processing documents, slides, etc.

FIG. 2 is a flow diagram illustrating an embodiment of a process for automatically generating a story. This process may be performed as part of another process such as the one further described with respect to FIG. 3. This process may be implemented on/by computer program specification builder 420 of FIG. 4 or by processor 1302 of FIG. 13.

In the example shown, the process begins by presenting an intake form, wherein the intake form is configured to gather a specification of requirements to be implemented for a computer program (200). For example, a record producer (or an intake form) gathers requirements. Digital intake forms may be stored in storage such as a service portal, an employee center, or in the native UI. In various embodiments, a particular record producer aligns with a specific requirement and contains questions for configuring an application or feature. The intake forms may be designed using user interface policies to hide and show relevant questions or make questions mandatory to ensure requirements are captured efficiently by only asking required questions.

The process receives user input for the intake form associated with the specification of requirements (202). The user input includes answers to questions/prompts presented in the intake form. As further described herein, the questions may be presented in natural/common language.

The process updates one or more tables based at least on the specification of requirements (204). In various embodiments, core requirements refer to requirements that may be used across different applications/products. As further described herein with respect to FIG. 5, specifically designated tables may contain core information while other tables contain information specific to an application or product.

The process creates one or more stories based at least on the updated one or more tables (206). An example of automatically creating a story is described with respect to FIG. 1.

The process outputs information associated with the one or more stories (208). The information may be output via a graphical user interface, an example of which is described with respect to FIG. 10

FIG. 3 is a flow diagram illustrating an embodiment of a process for developing a computer program. This process may be implemented on/by computer program specification builder 420 of FIG. 4 or by processor 1302 of FIG. 13.

In the example shown, the process begins by obtaining a story, wherein the story includes a desired goal associated with a desired feature for a computer program (300). The story may be automatically generated using the disclosed techniques (e.g., the process of FIG. 1 or FIG. 2).

The process receives approval of the story (302). Requirement records may be reviewed, e.g., by a (user-side) subject matter expert, (implementation-side) process consultant, or (implementation-side) technical consultant. This ensures that requirements are fully reviewed and aligned before stories are generated so that stories can be easily estimated and configured. In the context of a development process, the story is reviewed and approved by a process owner. A technical consultant makes configurations for a computer program based on the story parameters. Then, the computer program is tested and released/updated. An example of a review and approval process is further described with respect to FIG. 6.

The process configures the computer program based at least on one or more parameters of the story (304). A story may have various functionalities, e.g., configuration and testing may be performed within stories. A computer program may be created and configured by following the story such that requirements defined by the story are met.

The process tests the computer program (306). A variety of testing methods may be used to ensure the computer performs as desired.

The process deploys the computer program (308). For example, the computer program is made available for use.

Figure 4:
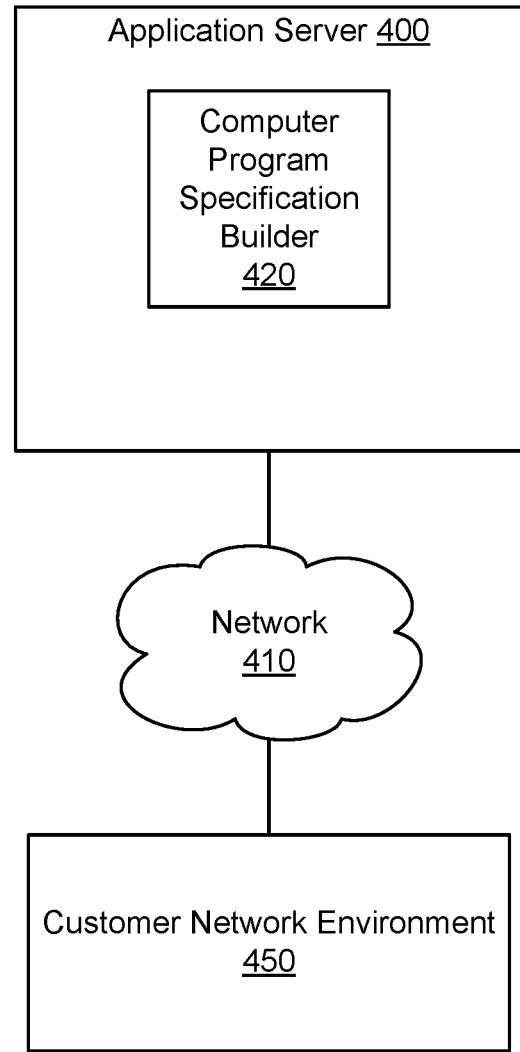
FIG. 4 is a block diagram illustrating an embodiment of a network environment including a computer program specification builder.

FIG. 4 is a block diagram illustrating an embodiment of a network environment including a computer program specification builder. In the example shown, application server 400 and customer network environment 450 are connected via network 410. Network 410 can be a public or private network. In some embodiments, network 410 is a public network such as the Internet. In various embodiments, application server 400 is a cloud-based application server that provides application services including an information technology operations management (ITOM) cloud service to determine metrics including resource expenditures of a digital service (sometimes simply referred to as "services") running within a customer network such as customer network environment 450. Application server 400 together with a server internal to customer network environment 450 are part of a platform for gathering requirements for a computer program specification and creating stories using the requirements.

In some embodiments, application server 400 provides cloud-based services for managing information technology operations including creating computer programs in cooperation with the customer's information technology environment. In some embodiments, application server 400 offers additional cloud services such as a configuration management database (CMDB) service for managing devices and/or configuration items for a customer.

In some embodiments, application server 400 provides machine learning functionality to determine requirements for a computer program specification, which in some cases may be customer-specific.

In some embodiments, customer network environment 450 is an information technology network environment and includes multiple hardware devices.

Although single instances of some components have been shown to simplify the diagram of FIG. 4, additional instances of any of the components shown in FIG. 4 may exist. For example, application server 400 may include one or more servers and/or may share servers. In some embodiments, components not shown in FIG. 4 may also exist. For example, network clients used to access application server 400 are not shown.

An example of computer program specification builder 420 is shown in FIG. 5.

FIG. 5 is a block diagram illustrating an embodiment of a computer program specification builder. The computer program specification builder 420 is configured to capture and refine requirements for a computer program specification, create/update records, and, optionally, automatically generate one or more stories. In this example, the computer program specification builder 420 includes a story generator 510, an auto-configuration manager 520, one or more story templates 508, and one or more requirement tables 512.

The story generator 510 is configured to generate one or more stories based on story templates. A story may be generated by populating a field of a story template by looking up information in a table (e.g., requirement table). Stories may be reviewed and edited as appropriate.

Although shown as part of builder 420 in this example, the story generator 510 may instead be external to the builder, and the builder interacts with the story generator to generate stories. For example, story templates 508 may be made available to the story generator and auto-configuration may generate/modify stories as further described herein.

The auto-configuration manager 520 is configured to pull data from requirement tables 512 and push configuration results to a story. In various embodiments, the manager configures available functions and fields associated with a story. The auto-configuration manager (sometimes referred to as a configuration assistant) may refer to requirement tables 512 to configure or define items based on fields in approved requirement records and stories. In various embodiments, the auto-configuration manager provides a custom UI action on a story table to auto configure the available functions and fields. In various embodiments, configuration status may be output. For example, the configuration status may include a record/report of what has been automatically configured, and what is available for manual configuration. Technical resources can use these records to review and test auto-configuration, while completing any manual steps to finalize the configuration.

The one or more story templates 508 is configured to combine requirement record inputs (e.g., information from requirement tables 512) and product tables 504. An example of a story template is described with respect to FIG. 8. In various embodiments, a story template includes one or more conditions. A condition builder enables different templates to split a requirement into multiple stories for easily managed configuration. For example, all requirements related to a core configuration are gathered using one form, including system properties and contact information, and then split into stories using conditions based on required configuration.

Compared with conventional techniques, the disclosed templates are more configurable and dynamic per implementation for whomever is creating the template. For example, a requirement can be broken down into several stories. A user may specify that a role is an IT specialist or IT agent, while other users may refer to the same/a similar role as simply agent. This allows the user to better configure and control terminology and branding.

The one or more requirement tables 512 includes one or more tables for a particular product containing requirement records. A particular requirement table may include one or more records that is a form view of requirements generated from record producers. In various embodiments, core requirements are included in a centralized table, which allows for an overview of common requirements. Product specific requirement tables enable reusable elements for repeatable configuration. Choices may be changed after a record producer submission. For example, choices/options for the requirements to be included in the specification may be determined based on information provided by a user (e.g., via an intake form).

In various embodiments, requirement categories are created to define core fields for a particular requirement, including, e.g., taxonomy, requirement type, the record producer, and the product line. This information may be used for classifying requirements and for reporting on requirements as they are gathered and completed.

The record producer 500 is configured to create requirements. For example, a record producer may include or be used as an intake form to gather information. A record producer may be used across different products, or be product/feature specific. A record producer may include (leading) questions and answers to guide requirement gathering conversations. In various embodiments, each record producer is added to a taxonomy (e.g., in an Employee Center) to make it visible by product, feature, and/or platform. An example of a record producer is described with respect to FIG. 7.

Core tables 502 include one or more tables referenced by requirement tables 512 and/or record producer 500 for fields for configuration. Product tables 504 include one or more tables specific to a particular product (or group of products) that pulls fields for product specific configuration. Reference tables 506 include one or more tables containing reference data.

In various embodiments, manual configuration may be performed by technical resources from information in stories. Original requirements may be referenced for more context. Manual configuration may be performed for items that cannot be auto-configured.

Although shown external to the computer program specification builder 420, one or more of the components 500-506 may be included in the builder 420.

In some embodiments, one or more of the story templates 508, requirement tables 512, core tables 502, product tables 504, and references tables 506 may be stored in one or more databases. In some embodiments, the one or more databases are implemented using one or more databases such as one or more distributed database servers.

Figure 6:
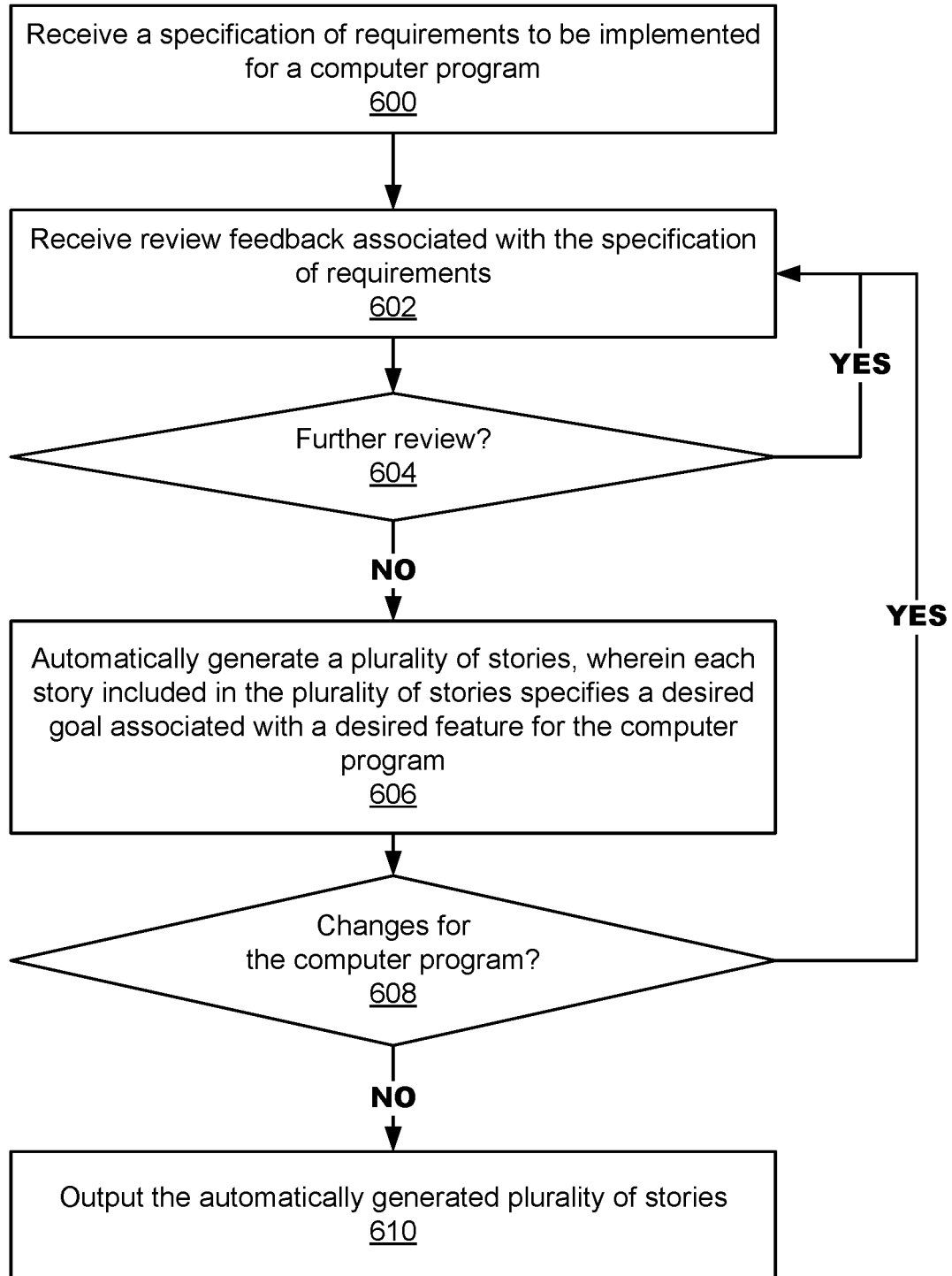
FIG. 6 is a flow diagram illustrating an embodiment of a process for automatically generating a story including incorporating review or change feedback.

FIG. 6 is a flow diagram illustrating an embodiment of a process for automatically generating a story including incorporating review or change feedback. This process may be implemented on/by computer program specification builder 420 of FIG. 4 or by processor 1302 of FIG. 13.

In the example shown, the process begins by receiving a specification of requirements to be implemented for a computer program (600). An example of a specification of requirements is 100 of FIG. 1.

The process receives review feedback associated with the specification of requirements (602). For example, a user reviews the requirements specified at 300. Optionally, the user may create additional requirements and assign the story for further review. In various embodiments, the review may be automatically performed, e.g., by a computer or a user that may perform the review with the assistance of a computer such as recommendations made by the computer.

The process determines whether there is further review (604). Whether further review is to be performed may be indicated in the review feedback of 602. In various embodiments, the further review may be process review and/or technical review. For example, process review may include obtaining additional information or reviews. Technical review may include technical viability review. The further review may be performed by one or more users and/or automatically. For example, a user with technical expertise may be asked to perform the technical viability review. If further review is to be performed, the process returns to 602. Otherwise, the process proceeds to 606.

The process automatically generates a plurality of stories, wherein each story included in the plurality of stories specifies a desired goal associated with a desired feature for the computer program (606). An example of generating a story is 102 of FIG. 1.

The process determines whether there are changes for the computer program (608). Changes may be needed based on review of the story. Whether changes are needed may be determined by one or more users (and/or automatically) who are the same or different from those who reviewed at 602. If changes are needed, the process returns to 602. Otherwise, the process proceeds to 610.

The process outputs the automatically generated plurality of stories (610). An example of outputting the stories is 102 of FIG. 1. A computer program specification builder phase of the process is completed. In various embodiments, configuration and testing are managed in stories (e.g., the user interacts with a story).

FIG. 7 shows an example of a graphical user interface for a record producer. As described herein, a record producer generates requirement records based on information gathered from users and/or systems. The graphical user interface shown here is an intake form that may be used to collect information.

In this example, the intake form collects information associated with a core requirement. The questions are presented in natural language in a colloquial way rather than a technical language to improve the understanding of the user from whom information is requested. The questions are merely exemplary and not intended to be limiting. In various embodiments, default values are pre-filled to reduce manual input. Default values may be determined from suggestions or the most common responses seen by the system. Help text and/or example text may be displayed to guide users. Some choices and/or options may require responses to ensure that complete requirements are formed.

In various embodiments, when a user interacts with a record producer (e.g., via an intake form), the user is able to input process requirements (such as business requirements) and not necessarily technical requirements. This may be especially helpful for users without technical expertise to understand what information is being sought.

In various embodiments, links to resources may be provided. An example of a form that includes links to resources is further described with respect to FIG. 12.

Figure 8:
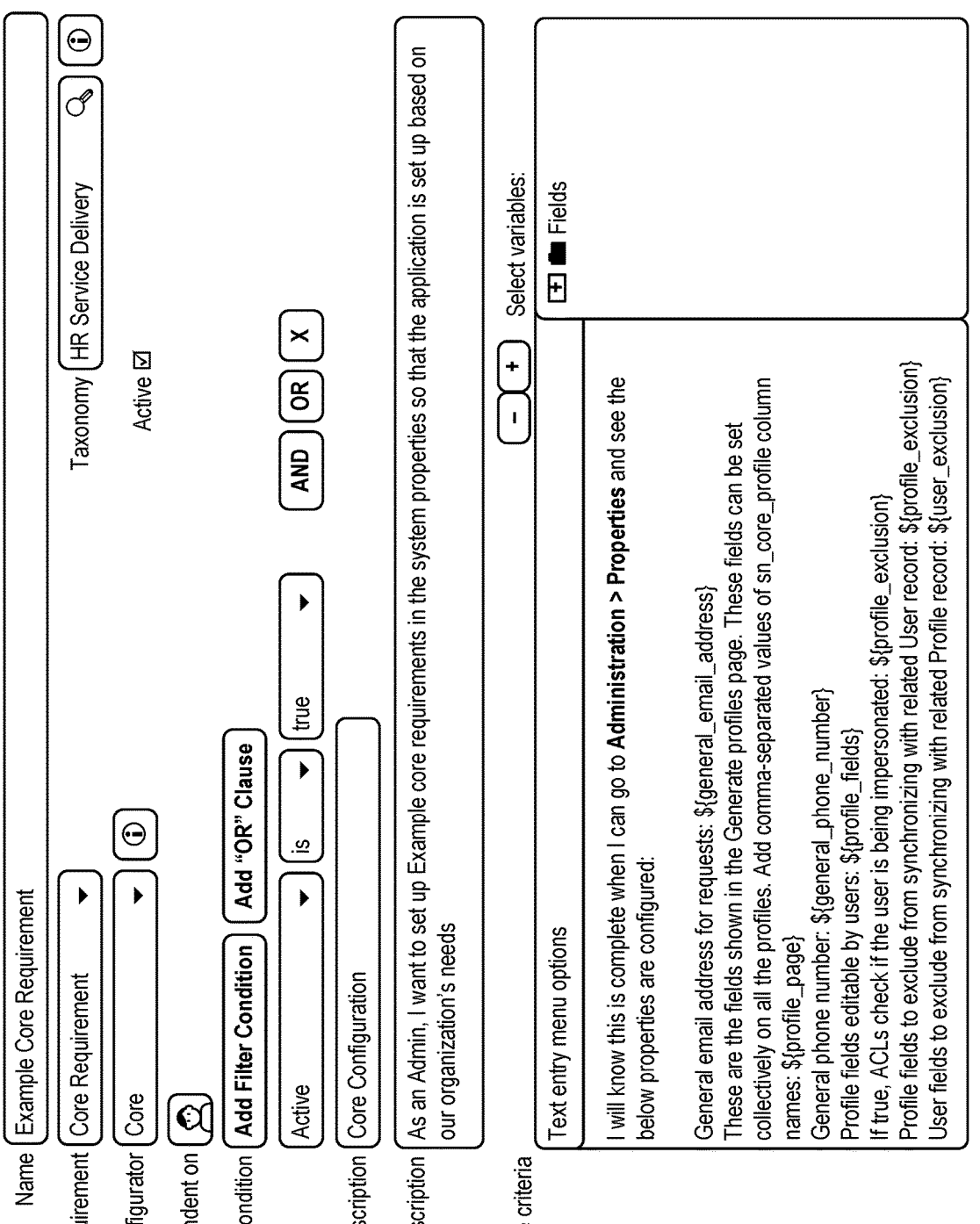
FIG. 8 shows an example of a graphical user interface for a story template.

FIG. 8 shows an example of a graphical user interface for a story template. The story template is reusable and created using a condition builder. Pre-defined structures facilitate the creation process because the information no longer needs to be entered manually. For example, pre-defined structures include "Short Description," "Description," and "Acceptance Criteria" as shown here.

Figure 9:
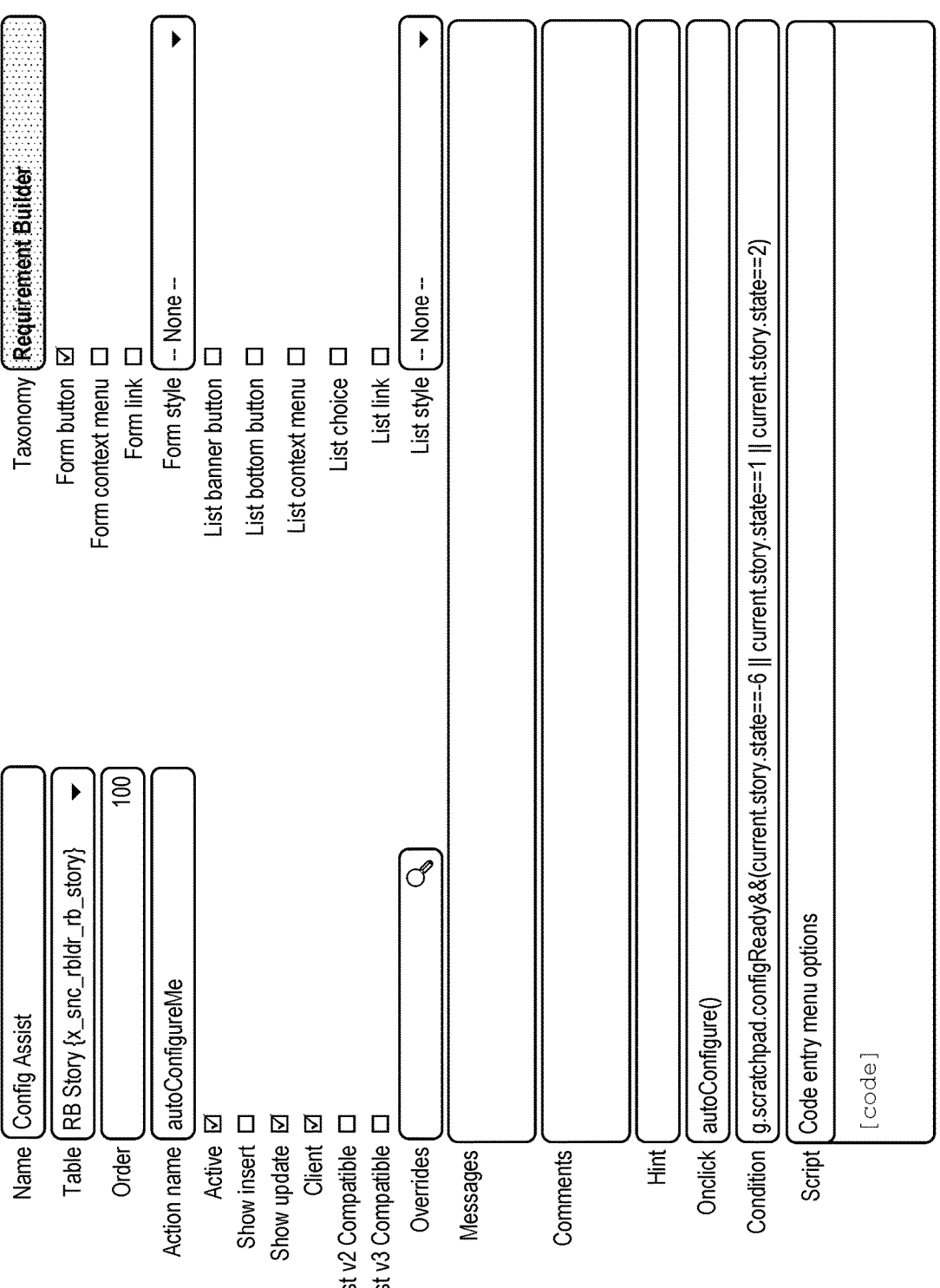
FIG. 9 shows an example of a graphical user interface for an auto-configuration manager.

FIG. 9 shows an example of a graphical user interface for an auto-configuration manager. In various embodiments, auto-configuration is a custom action to generate a configuration based on requirements. Auto-configuration facilitates the creation process because the information no longer needs to be manually retrieved from stories into configuration. The auto-configuration may be based on pre-defined dependencies and core configuration.

FIG. 10 shows an example of a graphical user interface for a computer program specification builder. In this example, a configuration message that can be generated automatically and output by the computer program specification builder is shown. The message communicates auto-configured elements and elements that are to be manually-configured. The configuration message can be converted into documents such as handover or technical documents.

Figure 11:
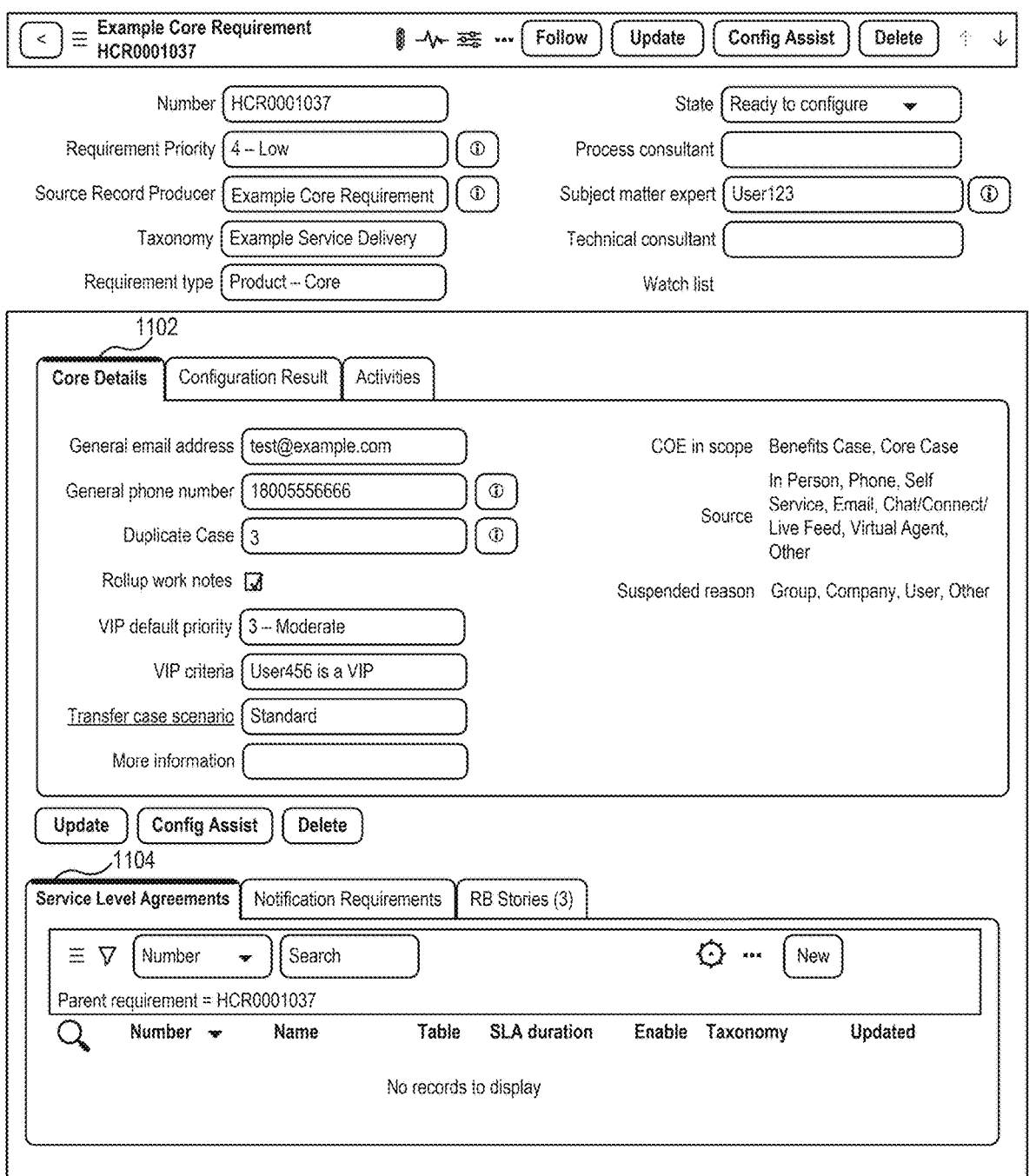
FIG. 11 shows an example of a graphical user interface for managing and tracking the progress of the plurality of stories and associated requirements.

FIG. 11 shows an example of a graphical user interface for managing and tracking the progress of the plurality of stories and associated requirements. This example shows a requirement record in which Core Details 1102 and Service Level Agreements 1104 may be viewed. Additional options are presents in other selectable tabs. Various aspects of the progress of stories and associated requirements may be tracked. For example, an option next to the Core Details tab 1102 is "Activities," which may be selected to view activities associated with this particular requirement. As another example, within Service Level Agreements (SLA) section 1104 characteristics such as when a particular SLA was updated, taxonomy, duration, table, name, and number may be displayed.

FIG. 12 shows an example of a graphical user interface a record producer including links to resources. This is helpful especially for users who are not as experienced to make appropriate decisions because choices are presented along with supplemental links to additional information if available. In this example, the links may be selected by clicking the bold and underlined text (e.g., list layouts). Selecting the link will cause additional information to be provided such as in a pop-up window, new window, or triggering a download.

Figure 13:
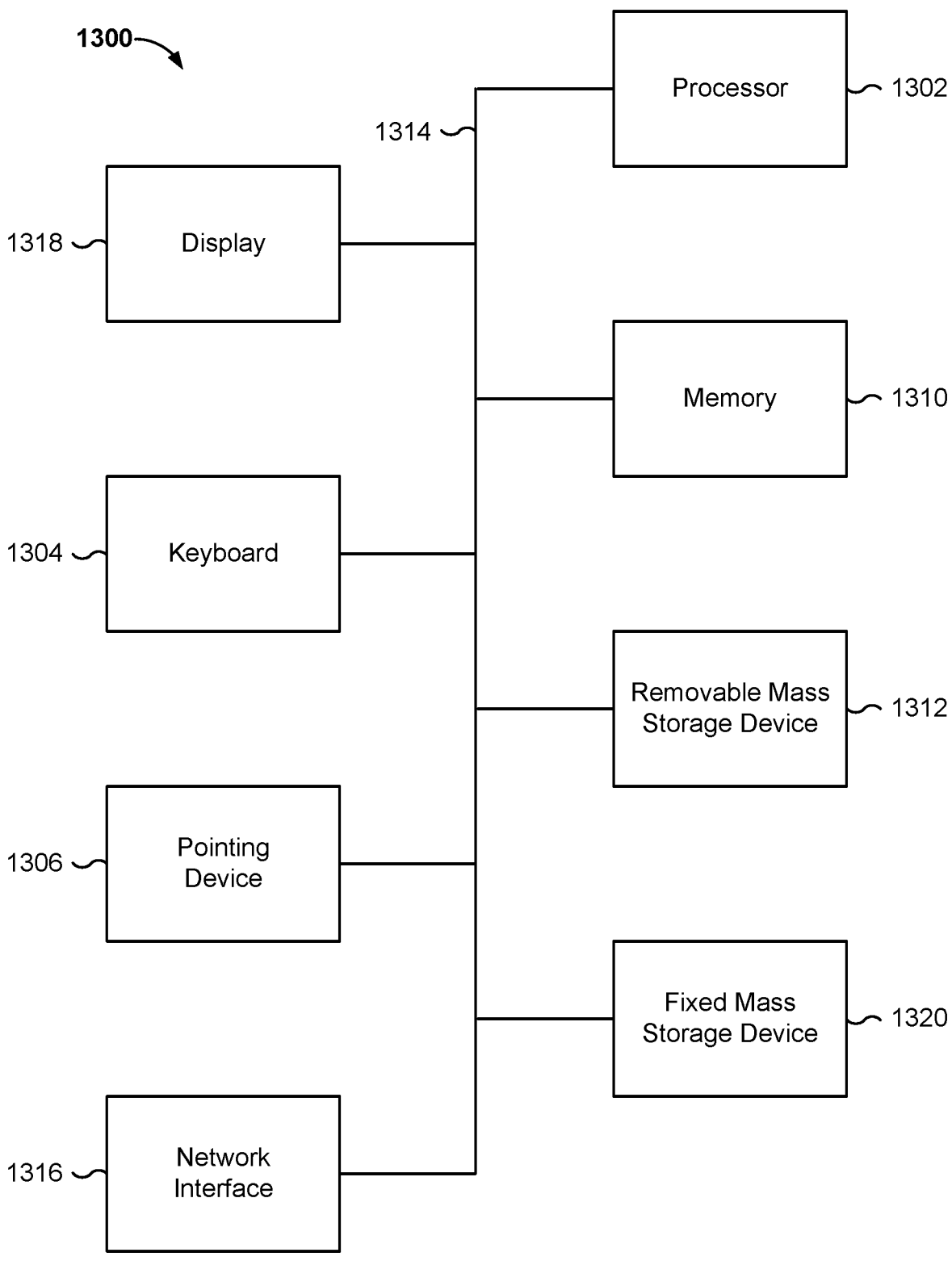
FIG. 13 is a functional diagram illustrating a programmed computer system for providing a computer program specification builder in accordance with some embodiments.

FIG. 13 is a functional diagram illustrating a programmed computer system for providing a computer program specification builder in accordance with some embodiments. As will be apparent, other computer system architectures and configurations can be used to prove a computer program specification builder. Computer system 1300, which includes various subsystems as described below, includes at least one microprocessor subsystem (also referred to as a processor or a central processing unit (CPU)) 1302. For example, processor 1302 can be implemented by a single-chip processor or by multiple processors. In some embodiments, processor 1302 is a general purpose digital processor that controls the operation of the computer system 1300. Using instructions retrieved from memory 1310, the processor 1302 controls the reception and manipulation of input data, and the output and display of data on output devices (e.g., display 1318). In some embodiments, processor 1302 includes and/or is used to provide a computer program specification builder and/or executes/performs the processes described herein with respect to FIGS. 2, 3, and 6.

Processor 1302 is coupled bi-directionally with memory 1310, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1302. Also as is well known in the art, primary storage typically includes basic operating instructions, program code, data and objects used by the processor 1302 to perform its functions (e.g., programmed instructions). For example, memory 1310 can include any suitable computer-readable storage media, described below, depending on whether, for example, data access needs to be bi-directional or uni-directional. For example, processor 1302 can also directly and very rapidly retrieve and store frequently needed data in a cache memory (not shown).

A removable mass storage device 1312 provides additional data storage capacity for the computer system 1300, and is coupled either bi-directionally (read/write) or uni-directionally (read only) to processor 1302. For example, storage 1312 can also include computer-readable media such as magnetic tape, flash memory, PC-CARDS, portable mass storage devices, holographic storage devices, and other storage devices. A fixed mass storage 1320 can also, for example, provide additional data storage capacity. The most common example of mass storage 1320 is a hard disk drive. Mass storages 1312, 1320 generally store additional programming instructions, data, and the like that typically are not in active use by the processor 1302. It will be appreciated that the information retained within mass storages 1312 and 1320 can be incorporated, if needed, in standard fashion as part of memory 1310 (e.g., RAM) as virtual memory.

In addition to providing processor 1302 access to storage subsystems, bus 1314 can also be used to provide access to other subsystems and devices. As shown, these can include a display monitor 1318, a network interface 1316, a keyboard 1304, and a pointing device 1306, as well as an auxiliary input/output device interface, a sound card, speakers, and other subsystems as needed. For example, the pointing device 1306 can be a mouse, stylus, track ball, or tablet, and is useful for interacting with a graphical user interface.

The network interface 1316 allows processor 1302 to be coupled to another computer, computer network, or telecommunications network using a network connection as shown. For example, through the network interface 1316, the processor 1302 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1302 can be used to connect the computer system 1300 to an external network and transfer data according to standard protocols. For example, various process embodiments disclosed herein can be executed on processor 1302, or can be performed across a network such as the Internet, intranet networks, or local area networks, in conjunction with a remote processor that shares a portion of the processing. Additional mass storage devices (not shown) can also be connected to processor 1102 through network interface 1316.

An auxiliary I/O device interface (not shown) can be used in conjunction with computer system 1300. The auxiliary I/O device interface can include general and customized interfaces that allow the processor 1302 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 13 is but an example of a computer system suitable for use with the various embodiments disclosed herein. Other computer systems suitable for such use can include additional or fewer subsystems. In addition, bus 1314 is illustrative of any interconnection scheme serving to link the subsystems. Other computer architectures having different configurations of subsystems can also be utilized.

The disclosed techniques may be applied in a variety of settings including for low-code or no-code platforms. A few examples will now be discussed. These examples are merely exemplary and not intended to be limiting.

Suppose a company is expanding their services from a first country to a second country. To create a computer program for the second country, the disclosed techniques may be used to create requirements for the computer program. For example, some requirements may be ported over from a computer program for the first country without modification while other requirements are modified. A reviewer may then approve the requirements for the computer program for the second country. This allows groups of computer programs to be scalable because new computer programs may be built quickly using/modifying requirements from existing computer programs.

In various embodiments, one or more computer programs may be developed based on a core configuration. The core configuration may be specified by a user/customer. For example, during a workshop, an outline of needed decisions is presented. General information typically asked of all customers may include: user information, users or groups of users to be loaded/integrated, set up groups, set up notifications, etc. These decisions and answers may be collected via the disclosed requirements builder.

One benefit of the requirements builder is that information is collected consistently. By contrast, conventional techniques typically capture information using a combination of different methods or products, which tends to be inconsistent. Using the example of a ServiceNow platform, a customer may implement human resources (HR), information technology service management (ITSM), and information technology operations management (ITOM) products. The same core information may be used across one or more of the products. Instead of collecting the core information multiple times, the information may be gathered a single time via the requirements builder. Each subsequent time a customer wishes to implement a new product, the information does not need to be gathered again. Instead the information can be automatically populated and optionally displayed to the customer for confirmation (in case of any changes), thus improving the efficiency of the program development process.

The disclosed techniques improve the functioning of a computer used to perform the disclosed techniques as well as the technical field of computer program specification generation by reducing manual effort and potential errors. For example, bugs such as a computer program not functioning because information is incomplete or incorrect may be reduced or avoided altogether. In various embodiments, valid choices are presented to a user based on data from a user's instance. As another example, the number or steps or screens presented may be dramatically reduced by automatically determining and populating relevant information. A process question may be automatically translated to technical requirements.

Usage patterns of the computer program specification builder may be helpful for a particular user or cross users. For example, if a majority (or some other threshold) of users configured a product a particular way, then the configuration can be made default or otherwise made generally available or incorporated into the product to improve usability and functionality for everyone. This may replace or supplement conducting customer feedback.

Output of the requirements builder may be included or otherwise used for reporting and analytics. For example, a statement of work may include information related to requirements. Suppose a customer wishes to configure an HR product with 10 HR services. Conventional stories typically cannot show the core (common) information provided, what information is already known, and what information is missing. The disclosed techniques collect and keep track of this information so that a list of requirements consistent with the statement of work is known and maintained. For example, if the customer provides requirements for 11 HR services, this exceeds the 10 HR services initially requested so the system will provide feedback to the customer to reduce the requirements or feedback is provided to sales that the customer may be encouraged to purchase additional services.

The disclosed techniques may help increase the adoption of products. Suppose a customer already has ITSM but does not have any services set up yet. The requirements builder helps the customer to easily set up services by providing core information once, and the customer can be informed that the information can be used across several services. In other words, the first step(s) of a configuration process are already completed because the core information can be used. This makes it easier for a user to begin using a tool or product.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a specification of requirements to be implemented for a computer program, wherein at least a portion of the specification of requirements is constrained based at least on client specific information stored in a database,
wherein at least one option corresponding to at least the constrained portion of the specification of requirements is determined by a trained machine learning model;
based on the specification of requirements, automatically generating a plurality of stories, wherein each story included in the plurality of stories specifies a desired goal associated with a desired feature for the computer program, wherein automatically generating the plurality of stories comprises:
updating at least one table based at least on the specification of requirements; and
creating the plurality of stories including by automatically populating a story template using records from the updated at least one table,
wherein automatically populating the story template includes determining at least a portion of the specification of requirements that corresponds to a respective field of the story template; and
providing a computer user interface to manage and track implementation progress of the plurality of stories associated with the specification of requirements.

2. The method of claim 1, wherein a story includes at least one of: a short description, a description, and acceptance criteria field.

3. The method of claim 2, wherein the at least one of: a short description, a description, and acceptance criteria field is determined based at least on a story template.

4. The method of claim 1, wherein a story of the plurality of stories includes one or more testable component requirements.

5. The method of claim 1, further comprising:
based at least on the automatically generated plurality of stories, determining at least one field for another story different from the automatically generated plurality of stories; and
automatically populating at least one field of the other story using the determined at least one field.

6. The method of claim 1, further comprising performing auto-configuration for a story of the plurality of stories based at least on pre-defined dependencies and a core configuration.

7. The method of claim 6, wherein the core configuration is based at least on at least one requirement table that stores core information.

8. The method of claim 1, wherein the specification of requirements is obtained via an intake form.

9. The method of claim 1, further comprising:

receiving, prior to automatically generating the plurality of stories, review feedback associated with the specification of requirements;

determining whether further review is to be performed, wherein automatically generating the plurality of stories is performed in response to a determination that further review is complete;

determining whether the computer program is complete; and outputting the automatically generated plurality of stories in response to a determination that the computer program is complete.

10. The method of claim 1, further comprising determining one or more technical requirements corresponding to the received specification of requirements, wherein the specification of requirements includes process requirements.

11. The method of claim 1, further comprising, in response to receiving user input associated with progress of a story of the plurality of stories, updating the implementation progress of the story.

12. The method of claim 11, further comprising, in response to receiving the user input associated with the story of the plurality of stories, approving the story to indicate that the specification of requirements has been met.

13. The method of claim 1, further comprising:

determining at least one dependency within the plurality of stories, wherein a dependency includes a shared requirement between two or more stories; and updating a story based on the shared requirement.

14. The method of claim 1, wherein the managing and tracking of the implementation progress of the plurality of stories includes managing a scrum in a development process.

15. A system, comprising:

a processor configured to:

receive a specification of requirements to be implemented for a computer program, wherein at least a portion of the specification of requirements is constrained based at least on client specific information stored in a database, wherein at least one option corresponding to at least the constrained portion of the specification of requirements is determined by a trained machine learning model;

based on the specification of requirements, automatically generate a plurality of stories, wherein each story included in the plurality of stories specifies a desired goal associated with a desired feature for the computer program, wherein the processor configured to automatically generate the plurality of stories comprises the processor configured to:

update at least one table based at least on the specification of requirements; and create the plurality of stories including by automatically populating a story template using records from the updated at least one table, wherein automatically populating the story template includes determining at least a portion of the specification of requirements that corresponds to a respective field of the story template; and provide a computer user interface to manage and track implementation progress of the plurality of stories associated with the specification of requirements; and a memory coupled to the processor and configured to provide the processor with instructions.

16. A computer program product embodied in a non-transitory computer readable medium and comprising computer instructions for:

receiving a specification of requirements to be implemented for a computer program, wherein at least a portion of the specification of requirements is constrained based at least on client specific information stored in a database, wherein at least one option corresponding to at least the constrained portion of the specification of requirements is determined by a trained machine learning model;

based on the specification of requirements, automatically generating a plurality of stories, wherein each story included in the plurality of stories specifies a desired goal associated with a desired feature for the computer program, wherein automatically generating the plurality of stories comprises:

updating at least one table based at least on the specification of requirements; and creating the plurality of stories including by automatically populating a story template using records from the updated at least one table, wherein automatically populating the story template includes determining at least a portion of the specification of requirements that corresponds to a respective field of the story template; and providing a computer user interface to manage and track implementation progress of the plurality of stories associated with the specification of requirements.

* * * * *